(12) United States Patent
Sorotzkin (10) Patent No.: US 7,660,854 B2
(45) Date of Patent: Feb. 9, 2010

(54) SYSTEM AND METHOD FOR CONFIRMING SPECIFICATION OF INTENDED ELECTRONIC MAIL MESSAGE RECIPIENTS

(76) Inventor: Michoel Sorotzkin, 4246 Okalona Rd., South Euclid, OH (US) 44121

( * ) Notice: Subject to any disclaimer, the term of this patent is extended or adjusted under 35 U.S.C. 154(b) by 0 days.

(21) Appl. No.: 09/894,966

(22) Filed: Jun. 28, 2001

(65) Prior Publication Data

US 2003/0005058 A1    Jan. 2, 2003

(51) Int. Cl.
*G06F 15/16* (2006.01)
(52) U.S. Cl. .................... 709/206; 715/752
(58) Field of Classification Search ............ 709/206; 345/752; 713/202; 715/752
See application file for complete search history.

(56) References Cited

U.S. PATENT DOCUMENTS 6,252,588 B1 * 6/2001 Dawson ............ 345/752
6,434,601 B1 * 8/2002 Rollins ............ 709/206
6,460,074 B1 * 10/2002 Fishkin ............ 709/206
6,671,718 B1 * 12/2003 Meister et al. ...... 709/206
2002/0019852 A1 * 2/2002 Bahar ............ 709/206
2002/0046250 A1 * 4/2002 Nassiri ............ 709/206
2002/0104026 A1 * 8/2002 Barra et al. ........ 713/202

* cited by examiner

*Primary Examiner*—Viet D. Vu
*Assistant Examiner*—Jungwon Chang
(74) *Attorney, Agent, or Firm*—Kalow & Springut, LLP (57) ABSTRACT

New and improved systems and methods for confirming transmission of email and other similar messages (e.g., instant messages, wireless device messages, etc.). Such systems and methods includes and involve generation means for permitting a sender to generate an email message to be sent to a specified recipient via a messaging system, confirmation means for confirming that the email message is to be sent to the specified recipient by presenting to the sender a confirmation notice requesting the sender to confirm that the specified recipient is an intended recipient of the email message, and sending means for causing the email message to be sent to the specified recipient via the messaging system after the sender operates the confirmation means and confirms that the specified recipient is an intended recipient.

17 Claims, 7 Drawing Sheets

SYSTEM AND METHOD FOR CONFIRMING SPECIFICATION OF INTENDED ELECTRONIC MAIL MESSAGE RECIPIENTS

BACKGROUND OF THE INVENTION

1. Field of the Invention

The present invention relates to

2. Description of the Related Art

Electronic messaging or "email" has become one of the most frequently used communications tools of the modern world. In fact, email has become a preferred means of communication in both private and commercial settings. Email is used to communicate every form of information including, but not limited to, confidential and, often, personal information. Unfortunately, email often is communicated to unintended recipient parties (individuals and groups) simply because a sender does not confirm correctness of a specified recipient's address information (e.g., an email address—such as JOE@domainname.com). The risks associated with such erroneous message transmission are exacerbated by the fact that often a single click of a messaging client toolbar button (e.g., a SEND button) can result in sending email to unintended, and, possibly, unknown parties (as in the case of incorrectly responding to unsolicited email). Accordingly, it can be said that such unintended email transmissions result from a general lack of safeguards provided by messaging client applications. And, as communications technologies have and continue to develop beyond email into instant messaging, and other non-voice-to-voice modes, for example, the problems associated with erroneous transmission are compounded.

Thus, there exists a need to provide new and improved systems and methods that will help senders of email and other similar messages (e.g., instant messages) to send their messages to actually intended recipients and to avoid erroneous transmission of messages.

SUMMARY OF THE INVENTION

The present invention solves the aforementioned problems associated with prior systems and methods used for transmission of email and other similar or like messages. In particular, the present invention permits users of messaging systems such as email systems, instant messaging systems, wireless phone-to-phone systems, etc., to confirm the specification of addressing information (e.g., email addresses) prior to transmission of their messages. Accordingly, the present invention improves existing email and other similar and like messaging systems by providing a level of personal security and comfort in that senders of messages can assure themselves that messages will be sent to actually intended recipients. As such, the present invention promotes message confidentiality and, ultimately, security.

In achieving the aforementioned benefits, the present invention provides systems and methods that include and involve generation means for permitting a sender to generate an email message to be sent to a specified recipient via a messaging system, confirmation means for confirming that the email message is to be sent to the specified recipient by presenting to the sender a confirmation notice requesting the sender to confirm that the specified recipient is an intended recipient of the email message, and sending means for causing the email message to be sent to the specified recipient via the messaging system after the sender operates the confirmation means and confirms that the specified recipient is an intended recipient.

The present invention and the aforementioned benefits and features are described in detail below with reference to the drawing figures which are attached hereto.

BRIEF DESCRIPTION OF THE DRAWINGS

The present invention is described in detail below with reference to the following drawing figures, of which.

DETAILED DESCRIPTION OF THE PREFERRED EMBODIMENTS

The present invention is now described in detail with regard to the drawing figures that were briefly described above.

Figure 1:
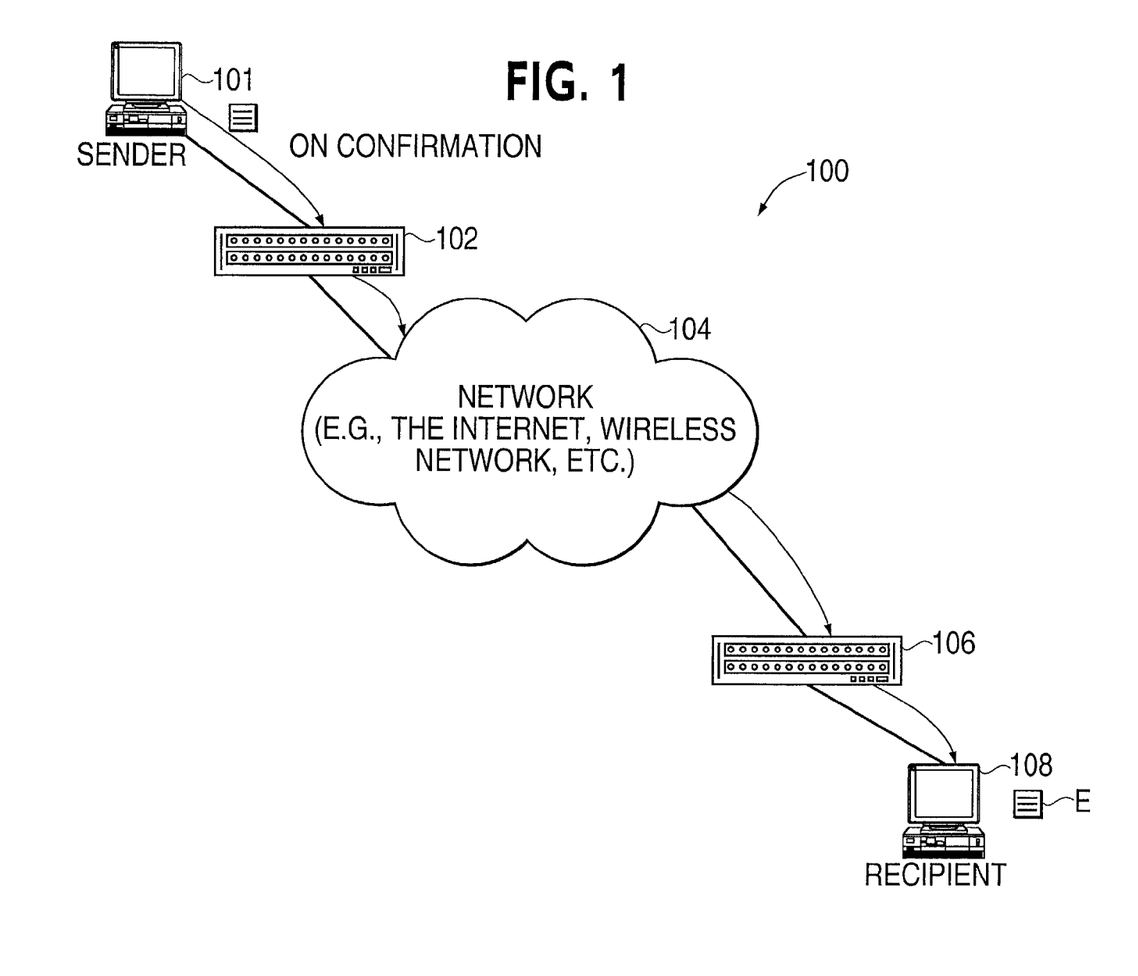
FIG. 1 is a diagram of a system in which a sender can generate a message such as an electronic mail (email) message and confirm addressing information prior to actual transmission in accordance with a preferred embodiment of the present invention.

Referring now to FIG. 1, depicted there is a diagram of a system in which a sender can generate a message such as an electronic mail (email) message, an instant network message, a wireless phone-type instant message, etc. and confirm recipient addressing information prior to actual transmission in accordance with a preferred embodiment of the present invention. In particular, within system 100, a sender 100 may generate an email message E in a conventional way such as by way of a compose function of an email client application running within a personal computer system—e.g., a MIME Compliant/Formatted email message. Such an email message E may sent via the sender's ISP and email provider 102 and via a network 104 (such as the Internet), and through a recipient's ISP and email provider 106 for ultimate receipt by a recipient 108. In accordance with the present invention, sender 100 may confirm the specification of recipient 108 prior to actual transmission of email message E to recipient 108. As will be discussed below with regard to FIGS. 2 through 5C, such a novel confirmation may take the form of presentation of dialog box type confirmation notices in conjunction with graphic displays, audio voicing of email addresses, or via other multimedia manifestations which are presented to sender 100 within his email client application. Such confirmation notices may take the form of audio streams (voicing of email addresses), video presentations, or combinations thereof to present confirmation notices that can be used by sender 100 to confirm that a particular sender is an actual intended recipient of email message E.

The present invention contemplates the use of conventional email systems and technologies to transport email messages across a network such as via the Internet, within an Intranet, or within any other automated data processing environment utilizing networking and conventional messaging technologies. Moreover, the present invention certainly contemplates the application of the confirmation technologies provided herein in the context of other messaging systems such as within instant messaging systems, messaging technologies utilized in wireless applications such as instant phone-to-phone communications, etc. Accordingly, references to email are intended to be broad based and certainly contemplate alternative messaging systems and services (e.g., instant messaging, etc.).

In the case of email communications, for example, the field or fields within a messaging scheme which hold the names and addresses of intended recipients of the email (for example, a primary email recipient, cc: addresses, blind cc: addresses, etc.) are specified by the sender of the email. On sending an email message, these fields are evaluated so that confirmation notices are provided in accordance with the present invention. Such confirmation notices may be voiced in conjunction with dialog boxes presented on a screen, for example, etc. Such voice confirmation notices may take the form of "Are you sure you want to send this email message to 'alfred@hotmail.com', having email address 'a-l-f-r-e-d@h-o-t-m-a-i-l.com'? . . . . If yes, click OK and, if not, click Cancel or NO." Accordingly, the present invention can be configured to look for a response by the sender in order to actually transmit a message such as an email message to an intended recipient. Accordingly, the present invention prevents email messages from being sent to unintended individuals, and aids senders to not disclose information to unintended parties. Those skilled in the art will immediately appreciated that the nature and language of a confirmation notice/dialog provided by the present invention may take on any definition that suits particular design and implementation requirements.

Figure 2:
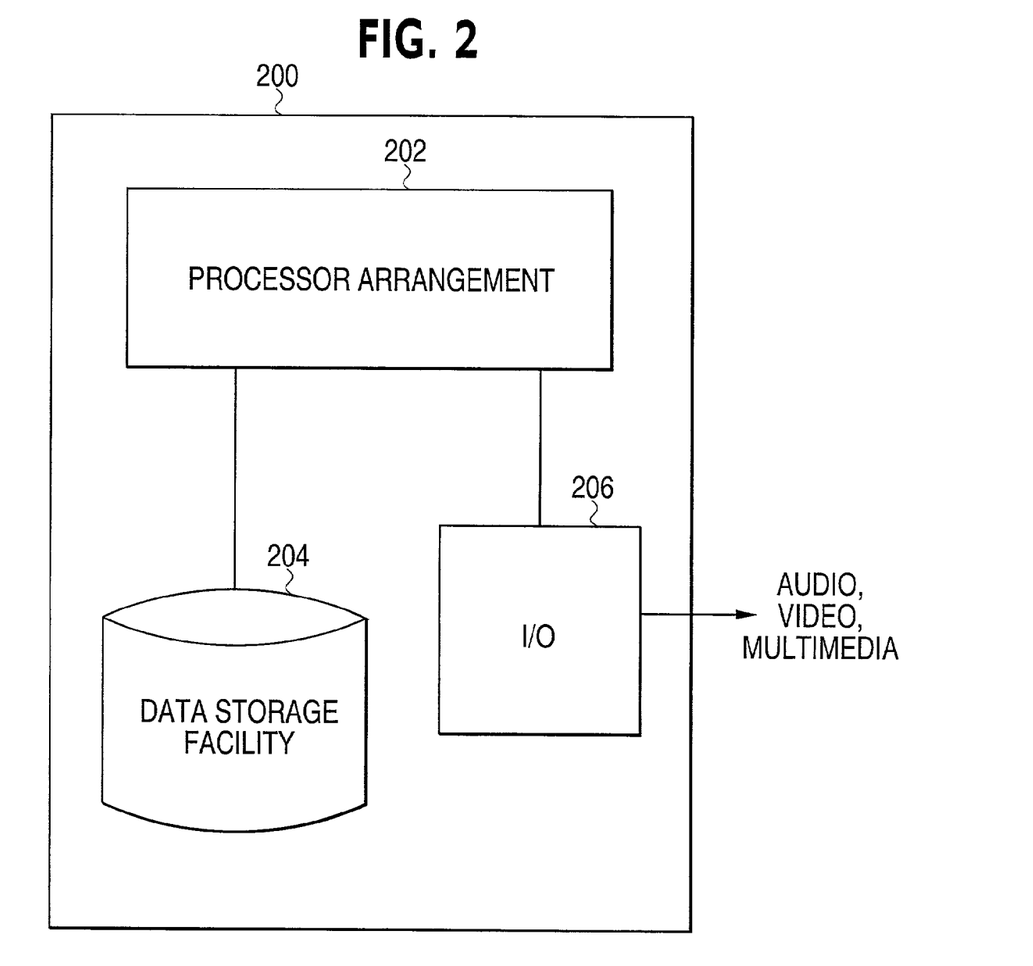
FIG. 2 is a block diagram of an automatic data processing system that is configured in accordance with the present invention to facilitate confirmation of email recipients in accordance with a preferred embodiment of the present invention.

Referring now to FIG. 2, depicted therein is a block diagram of an automatic data processing system that is configured in accordance with the present invention to facilitate the confirmation of email recipients in accordance with a preferred embodiment of the present invention. Automated data processing system 200 is one that may be used by a sender in accordance with the present invention. Automated data processing system includes a processor arrangement 202 which is coupled to a data storage facility 204 and to input and output (I/O) facilities 206 such as speakers within a sound card, a video monitor, a printer, etc. Those skilled in the art will immediately understand the arrangement shown within system 200 as a computing platform which may be outfitted in accordance with the present invention to provide confirmation notices to confirm email recipients. Such an automated data processing system may be implemented using a personal computer similar or like an IBM compatible computer running the Microsoft® Windows™ 98 operating system. Accordingly, I/O facilities 206 may include any type of computer peripheral device for providing, for example, audio streams such as automatically played email address voice streams, video displays, and combinations thereof (including multimedia presentations), to a sender in the context of a messaging client application (e.g., email client, a wireless phone-to-phone client application, an instant messaging client, etc.).

Figure 3:
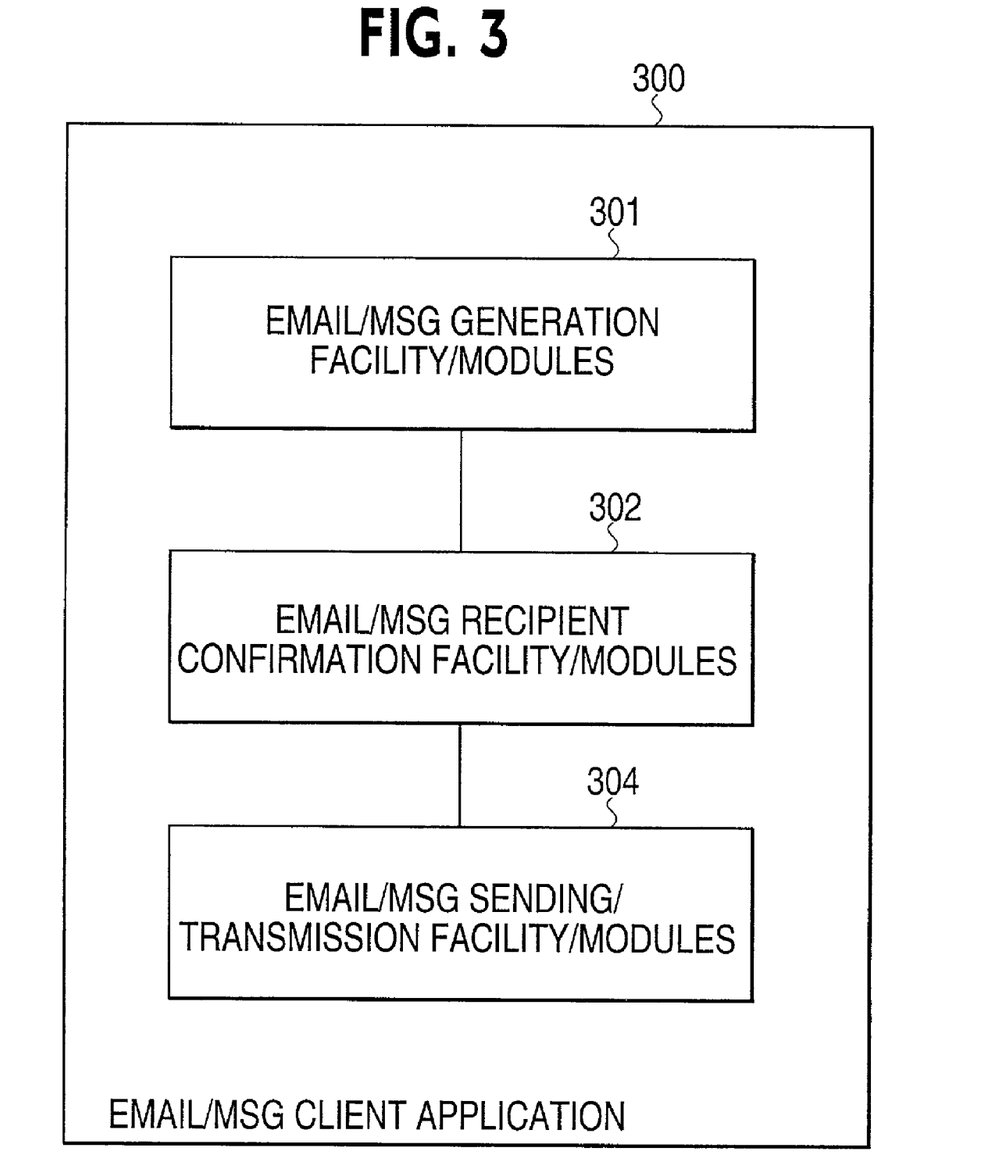
FIG. 3 is a block diagram that illustrates the modules and facilities such as objects that make up a software system that may be executed within the data processing system depicted in FIG. 2 to facilitate confirmation of email recipients and addressing information in accordance a preferred embodiment of the present invention.

Referring now to FIG. 3, depicted therein is a block diagram that illustrates the modules and facilities such as objects that make up a software system provided by the present invention and that maybe executed within the data processing system depicted in FIG. 2 to facilitate confirmation of email recipient addressing information in accordance with a preferred embodiment of the present invention. In particular, software system 300 includes, among other software objects and routines, several modules for providing an email generation facility/module 301, an email recipient confirmation facility/module 302, and an email sending/transmission facility/module 303. The interaction of facilities 301 through 303 is further discussed below with regard to FIGS. 4 and 5A through 5C.

Figure 4:
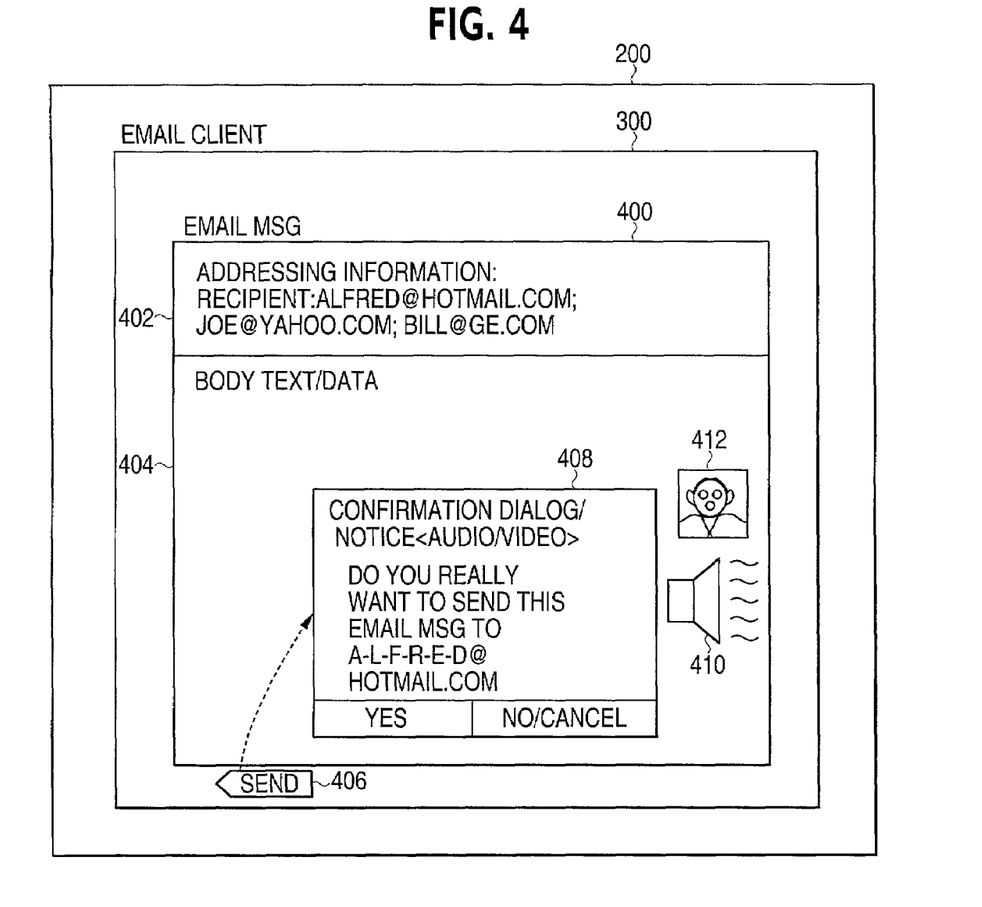
FIG. 4 is a exemplary screen shot that illustrates a confirmation session that results from execution of a software system like or similar to the one depicted in FIG. 3.

Referring now to FIG. 4, depicted therein an exemplary screen shot that illustrates the confirmation session that results from execution of a software system like or similar to one depicted in FIG. 3. In particular, an email client 300 is shown as running within data processing system 200. Email client 300 may be similar in structure, appearance, and operation to Microsoft Outlook® which is manufactured by Microsoft Corporation. Outlook® is a trademark and/or registered trademark of Microsoft Corporation.

Within email client 300, a sender has instantiated generation of a email message 400. Email message 400 includes an addressing information section 402 in which a sender will specify email/msg addresses of specified parties who may be considered intended recipients prior to confirmation, and body text/data forming part of email message 400 as body text section 404. Email message 400 is a conventional email message and may be one that includes attachments and the like in a conventional way. Such an email message will be readily understood by those skilled in the art.

Once email message 400 has been generated to the satisfaction of a sender, he/she may elect to transmit the message to his/her designated recipient(s). Such operation normally occurs within an email client like or similar to email client 300 by operation of a send button 406. Upon clicking send button 406, a confirmation sequence including the presentation of a confirmation dialog/notice 408 will presented to the sender. Confirmation dialog/notice 408 may also include the presentation of multimedia presentations including audio and video content. The essence of confirmation dialog/notice 408 is to allow the sender to confirm delivery and transmission of email message 400 to each one of the specified recipients as designated within addressing information section 402 of email message 400. The presentation of a dialog box and one that allows a user to select a YES/NO/CANCEL operation will be immediately understood by those skilled in the art.

Confirmation dialog/notice 408 will present an inquiry in the form "Do you really want to send this email message to alfred@hotmail.com?" Such an inquiry may take the form of a multimedia presentation including audio and video content as illustrated at audio content (speaker) 410, and video content 412 such as in the form of a picture or thumbnail image (e.g., a pre-stored .jpg, .gif, file, etc.) of or otherwise corresponding to a specified recipient. Accordingly, the present invention permits a audible message such as automated voicing of a person's email address or other stream (e.g., "Your Best Friend Alfred") corresponding to a specified recipient to be played via speakers and other input/output facilities of a sender's data processing system, as well as the presentation of screen based image corresponding to a specified recipient. In this way, a sender will able to confirm and satisfy himself that he has properly specified the email address for the person/group to whom he intends his message to be sent. It is important to note that a key feature of the present invention is the ability to allow a sender to create and specify a mapping form identifying data relating to a particular address (e.g., an email address, a phone number, an instant messaging address, etc.) to a particular person/group—e.g., a sender may configure his email client provided in accordance with the present invention to show a family picture corresponding to his best friend, or to play a wedding song to illustrate correspondence to his wife's email address.

The structures and operations discussed above are designed and intended to operate together to provide the functionality described in detail herein. To illustrate such resultant functionality, reference is now made to the flowchart illustrated in FIGS. 5A-5C.

Figure 5A:
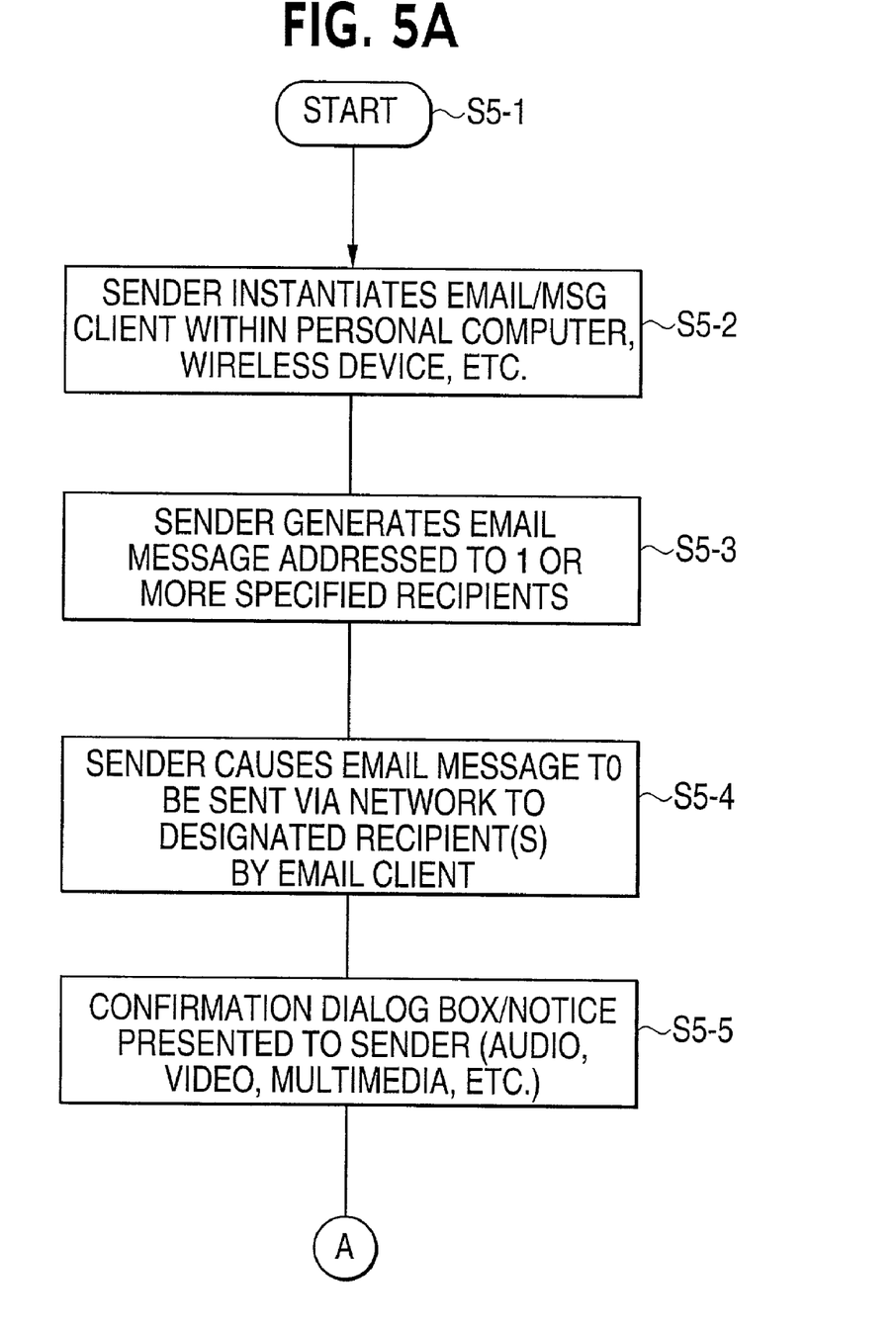
FIG. 5A is a flowchart that illustrates method steps involved in facilitating confirmation of email recipients and corresponding addressing information in accordance with a preferred embodiment of the present invention.

With specific reference to FIG. 5A, depicted therein is a flowchart that illustrates method steps involved in facilitating confirmation of email recipients and corresponding addressing information in accordance with a preferred embodiment of the present invention. In particular, processing and operations start a step S5-1 and immediately proceed to step S5-2. At step S5-2, a sender will instantiate an email client or similar messaging client such as the one depicted in FIG. 3 to derive a screen display image similar or like the one shown in FIG. 4. Such operation may occur as a result of running an email client within a Windows™ based operating system running on a automated data processing system such system 200 as depicted in FIG. 2.

Next, at step S5-3, the sender will generate an email message addressed to one or more recipients (e.g., to alfred@hotmail.com).

Next, at step S5-4, the sender will cause the email message to be sent by the email client such as via a clicking operation of SEND button 406 (FIG. 4).

Next, at step S5-5, a confirmation dialog/notice will be presented to the sender. Such a dialog/notice may include multimedia content, including audio content, video content, as well as combinations thereof.

Figure 5B:
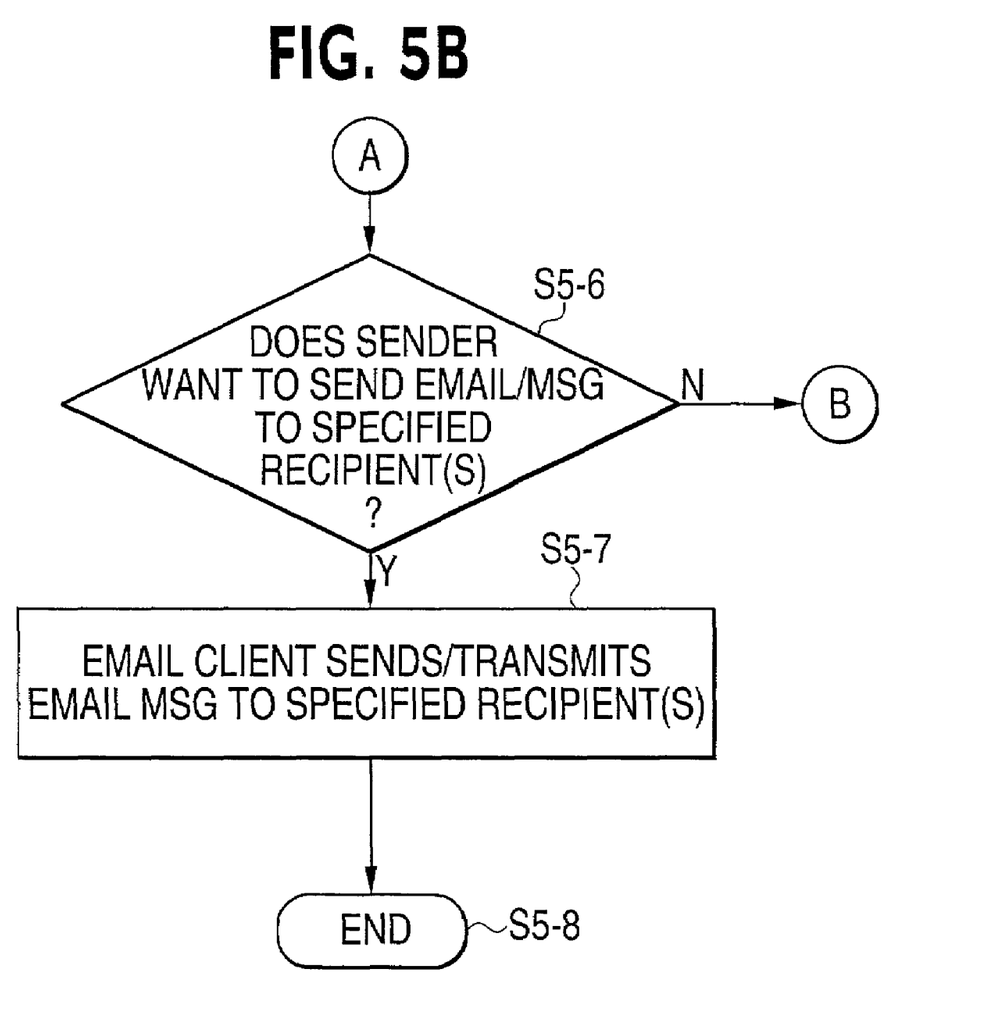
FIG. 5B is a continuation flowchart of the flowchart started in FIG. 5A.

Processing and operations continue at step S5-6 at the top of FIG. 5B.

At step S5-6, a determination will be made as to whether the sender wants to send the email message to a particular specified recipient. Such an inquiry may include the presentation of audio content, video content or via other multimedia content manifestation.

If the determination at step S5-6 is affirmative, processing proceeds to step S5-7. At step S5-7, the email client will send/transmit the email message to the specified recipient via a network connection such as via the Internet, via some form of communications network (e.g., a wireless communications network), etc.

Thereafter, processing and operations end at step S5-8. However, if the sender specified more than one recipient within the address information of a particular email message the sequence shown in FIG. 5B can be repeated based on the number of recipients specified by the sender, for example.

Figure 5C:
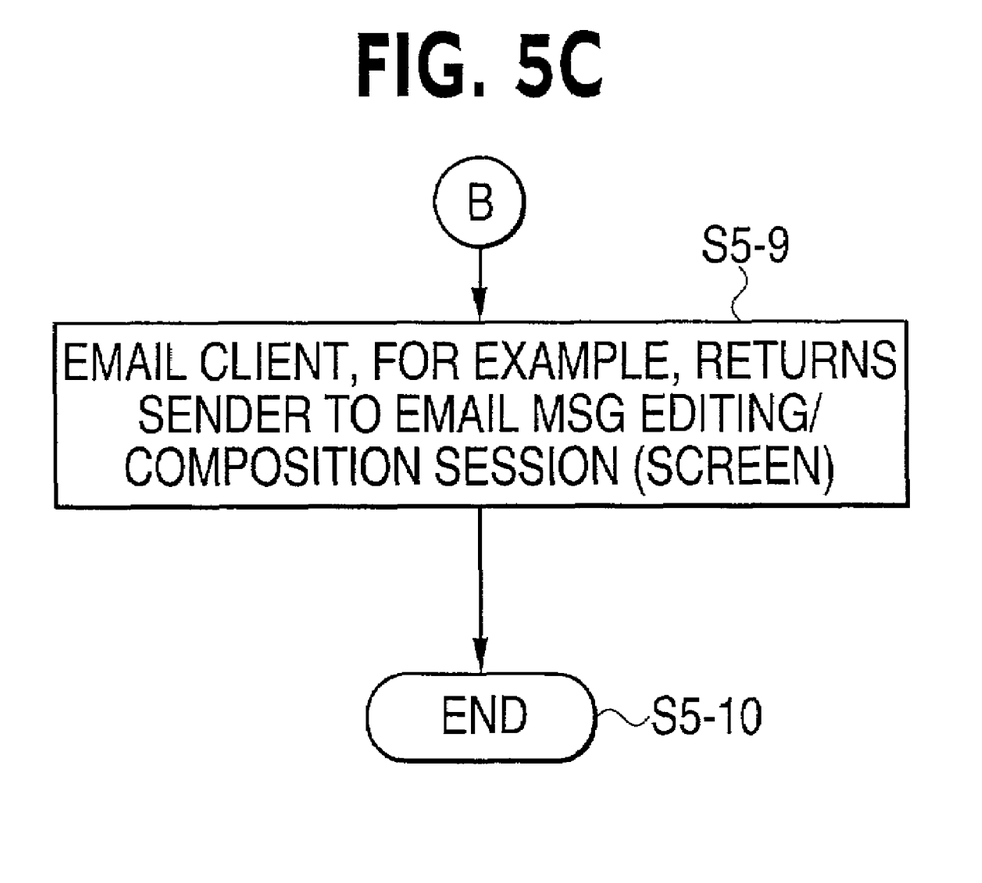
FIG. 5C is the conclusion of the flowchart illustrated in FIGS. 5A and 5B.

If the determination at step S5-6 is negative, processing and operations continue at step S5-9 at the top of FIG. 5C.

In particular, at step S5-9, the email client will return the sender to the email message editing/composition session or present some other type of dialog to the sender to indicate that the sender has confirmed that the specified recipient is otherwise not intended.

Processing and operations end at step S5-10.

Thus, having fully described the present invention by way of example with reference to the attached drawing figures, it will be readily appreciated that many changes and modifications may be made to the invention and to any of the exemplary embodiments shown and/or described herein without departing from the spirit or scope of the invention which is defined in the appended claims.

What is claimed is:

1. An email client, comprising:
generation means for permitting a sender to generate an email message to be sent to a specified recipient via a messaging system;
confirmation means for confirming that said email message is to be sent to said specified recipient by presenting to said sender a confirmation notice, said confirmation notice requesting said sender to confirm that said specified recipient is an intended recipient of said email message, wherein said confirmation means includes a picture presentation facility, said picture presentation facility configured to present to said sender a picture of said specified recipient; and
sending means for causing said email message to be sent to said specified recipient via said messaging system after said sender operates said confirmation means and confirms that said specified recipient is said intended recipient.

2. The email client according to claim 1, wherein said confirmation means further includes an audio stream presentation facility, said audio stream presentation facility configured to present to said sender an audio stream corresponding to said specified recipient.

3. The email client according to claim 2, wherein said audio stream presentation facility is further configured to voice said audio stream and to play an audio sequence that identifies said specified recipient.

4. The email client according to claim 1, wherein said confirmation means further includes a multi-media presentation facility, said multi-media presentation facility configured to present to said sender a multi media presentation corresponding to said specified recipient.

5. The email client according to claim 4, wherein said multi-media presentation includes audio and video sequences identifying said specified recipient.

6. The email client according to claim 1, wherein said generation means permits said email message to be formatted according to a pre-defined messaging standard.

7. The email client according to claim 6, wherein said pre-defined messaging standard permits said email message to be transported via the Internet.

8. An email client, comprising:
a email generator configured to permit a sender to generate an email message to be sent to a specified recipient via a messaging system;
a confirmation facility configured to confirm that said email message is to be sent to said specified recipient by presenting to said sender a confirmation notice, said confirmation notice requesting said sender to confirm that said specified recipient is an intended recipient of said email message, wherein said confirmation facility includes a picture presentation facility, said picture presentation facility configured to present to said sender a picture of said specified recipient; and
a sending facility configured to cause said email message to be sent to said specified recipient via said messaging system after said sender confirms that said specified recipient is said intended recipient.

9. The email client according to claim 8, wherein said confirmation facility includes an audio stream presentation facility, said audio stream presentation facility configured to present to said sender an audio stream corresponding to said specified recipient.

10. The email client according to claim 9, wherein said audio stream presentation facility is further configured to voice said audio stream and to play an audio sequence that identifies said specified recipient.

11. The email client according to claim 8, wherein said confirmation means further includes a multi-media presentation facility, said multi-media presentation facility configured to present to said sender a multi-media presentation corresponding to said specified recipient.

12. The email client according to claim 11, wherein said multi-media presentation includes audio and video sequences identifying said specified recipient.

13. A method for sending email to intended recipients, comprising the steps of:

permitting a sender to generate an email message to be sent to a specified recipient via a messaging system;

confirming that said email message is to be sent to said specified recipient by presenting to said sender a confirmation notice, said confirmation notice requesting said sender to confirm that said specified recipient is an intended recipient of said email message, wherein said confirmation notice includes a picture of said specified recipient; and causing said email message to be sent to said specified recipient via said messaging system after said sender confirms that specified recipient is said intended recipient during confirming step.

14. The method according to claim 13, wherein said confirmation notice includes an audio stream presentation corresponding to said specified recipient.

15. The method according to claim 14, wherein said audio stream includes content configured to be voiced.

16. The method according to claim 13, wherein said confirmation notice includes a multi-media presentation corresponding to said specified recipient.

17. The email client according to claim 16, wherein said multimedia presentation includes audio and video sequences identifying said specified recipient.

* * * * *